United States Patent
Hutchings, Sr.

[15] 3,677,093
[45] July 18, 1972

[54] BALANCING HEADS FOR DYNAMIC BALANCING MACHINES

[72] Inventor: Paul D. Hutchings, Sr., Big Rapids, Mich.
[73] Assignee: Hanchett Company, Big Rapids, Mich.
[22] Filed: Oct. 30, 1970
[21] Appl. No.: 85,452

[52] U.S. Cl. ........................................................... 73/473
[51] Int. Cl. ..................................................... G01m 1/02
[58] Field of Search ............................. 73/66, 460, 471–478, 73/462–470

[56] References Cited

UNITED STATES PATENTS 3,452,604  7/1969  Schaub ..................................... 73/475

FOREIGN PATENTS OR APPLICATIONS 157,962  4/1922  Great Britain ........................... 73/478

Primary Examiner—James J. Gill
Attorney—Johnson, Dienner, Emrich, Verbeck & Wagner

[57] ABSTRACT

Balancing head used for supporting the opposite ends of a rotor being balanced in a dynamic balance machine constructed with a top head unit adapted to have a rectilinear reciprocatory motion relative to a fixed bottom head unit. A pair of hydrostatic bearings are provided between the top and bottom head units to reduce friction therebetween. A pair of magnetic devices are provided between the top and bottom head units to center the top head unit relative to the bottom head unit and to restrain the override horizontal movement of the top head unit.

8 Claims, 6 Drawing Figures

PATENTED JUL 18 1972

Inventor:—
Paul D. Hutchings, Sr.,
By Johnson, Dienner, Emrich,
Verbeck & Wagner  Attys.

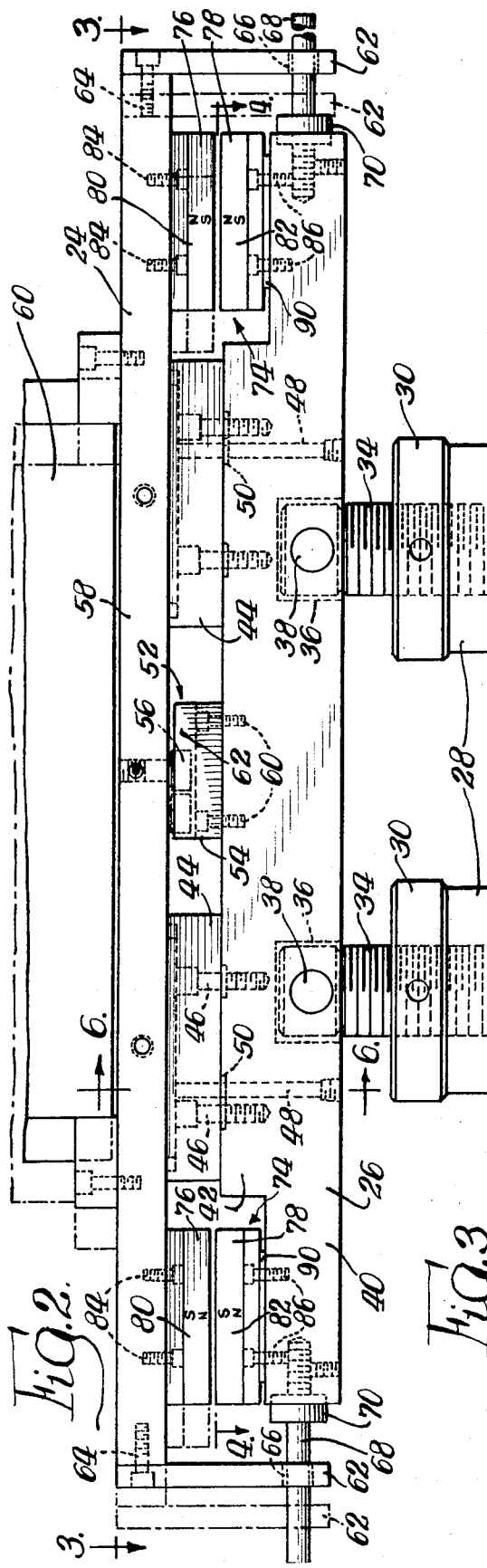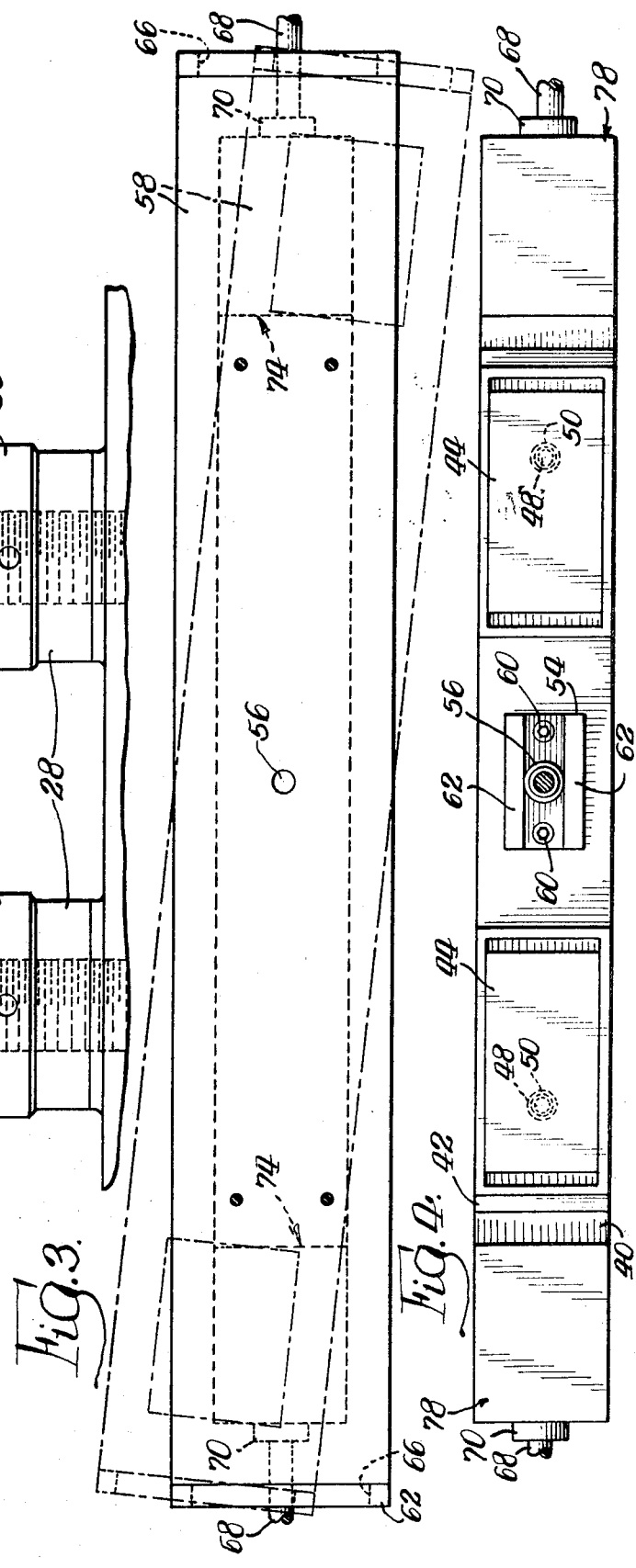

BALANCING HEADS FOR DYNAMIC BALANCING MACHINES

BACKGROUND OF THE INVENTION

This invention relates to a new and improved balancing head design used to support a rotor while being balanced in a dynamic balancing machine having a sling-type arrangement.

In sling-type balancing machines, the rotor, which is free to swing, must be lifted as it moves away from a static condition. This required lifting force becomes substantial as the weight of the rotor increases and necessitates a proportional increase in the power requirements of the drive system for the balancing machine.

This invention provides a new and improved balancing head design that substantially reduces the inherent frictional forces introduced by each balancing head and thereby increases the lifting capabilities of the balancing machine.

SUMMARY OF THE INVENTION

The balancing heads incorporating the features of this invention are designed to be used on balancing machines that employ a sling-type arrangement to allow it to swing while being balanced. Since in sling-type of balancing the rotor is actually lifted each time it is moved from a static condition, the required lifting force for large rotors, such as a paper mill roll, becomes prohibitory large.

This invention reduces the lifting force factor of a dynamic balancing machine by reducing the friction introduced by the two balancing heads and by reducing the mass of the balancing heads that has to be moved. To this end, there are provided hydrostatic bearing means between the movable top head unit and the stationary bottom head unit. Also, a magnetic centering device provides a strong magnetic field of attraction between the top and bottom unit to center the top head unit relative to the bottom head unit without any metal-to-metal contact.

DESCRIPTION OF DRAWINGS

For a better understanding of this invention, reference may be made to the accompanying drawing, in which:

FIG. 1 is a front perspective view of a sling-type dynamic balancing machine to illustrate the type of machine the invention could be used with;

FIG. 2 is an elevational side view of a balancing head incorporating the principles of this invention;

FIG. 3 is a sectional view taken along the line 3—3 of FIG. 2;

FIG. 4 is a sectional view taken along the line 4—4 of FIG. 2;

DESCRIPTION OF PREFERRED EMBODIMENT

Figure 1:
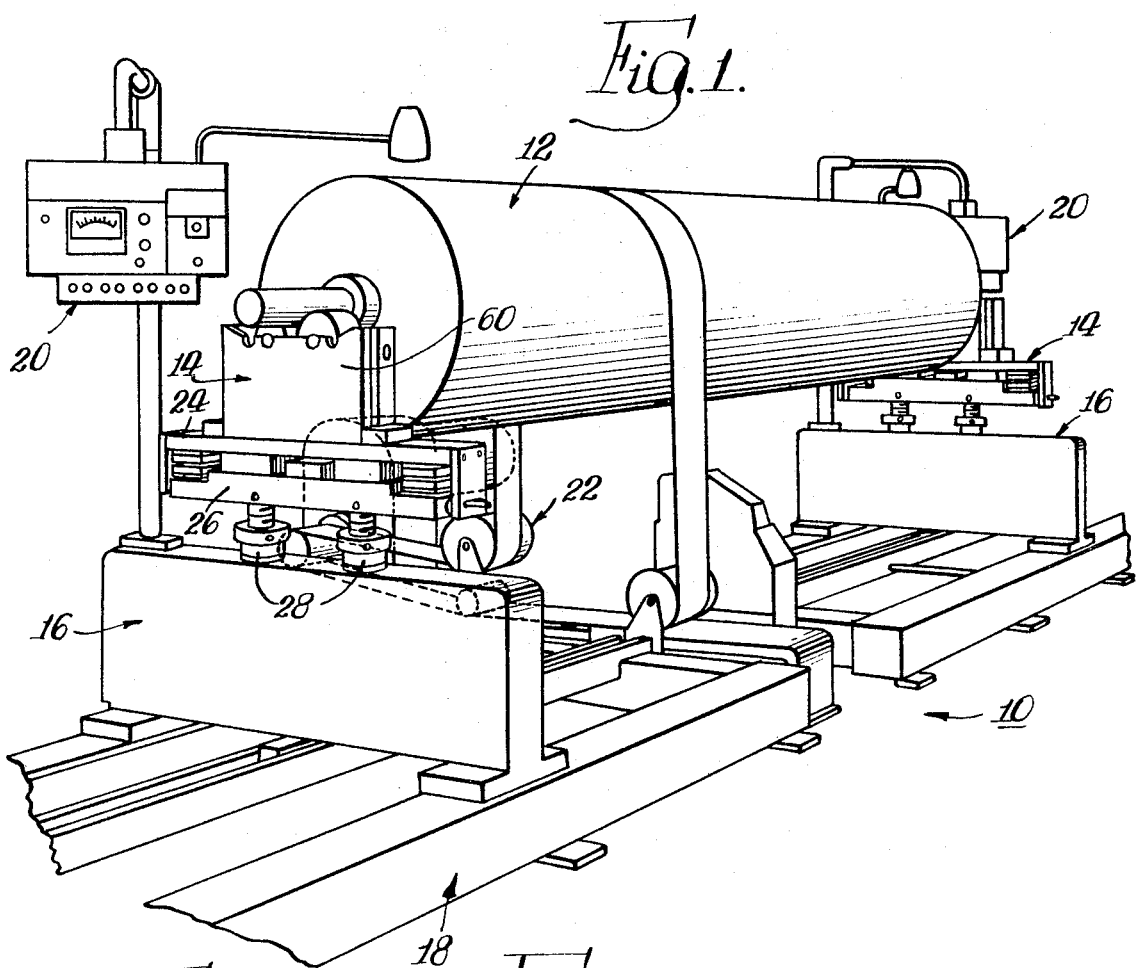

Referring to FIG. 1, there is depicted a balancing machine 10 used to balance a rotor 12. In particular, the balancing machine 10 uses a sling-type arrangement to allow the rotor to swing while being balanced. The rotor 12 being balanced is supported at its opposite ends by a pair of balancing heads 14 which are positioned in a spaced apart relation by a pair of pedestals 16. The pedestals 16 are detachably secured to base 18 and can be moved toward and away from each other to accommodate various rotor sizes. Balancing machine 10 includes a pair of swivel booms 20 which carry all its electrical controls and instruments, and an endless belt drive assembly 22.

In balancing machines using sling-type arrangements, such as depicted in FIG. 1, the rotor is free to swing during the balancing operation and the rotor is actually lifted each time it is moved from a static condition. This invention provides a new and improved balancing head design which substantially reduces the inherent frictional restraining forces introduced by the balancing heads and thereby increases the lifting force capabilities of a balancing machine.

Referring to FIG. 2, balancing head 14 comprises a top head unit 24 and bottom head unit 26. Bottom head unit 26 is mounted on pedestal 16 by a pair of adjustable leg members 28.

The leveling purposes, the leg members 28 are independently adjustable by turning the nut 30, which seats on collar 32, about the screw 34. The pair of screws 34 extend downwardly from the bottom surface of bottom head unit 26 and their upper ends are mounted in recesses 36 by means of cross pins 38.

Figures 5, 6:
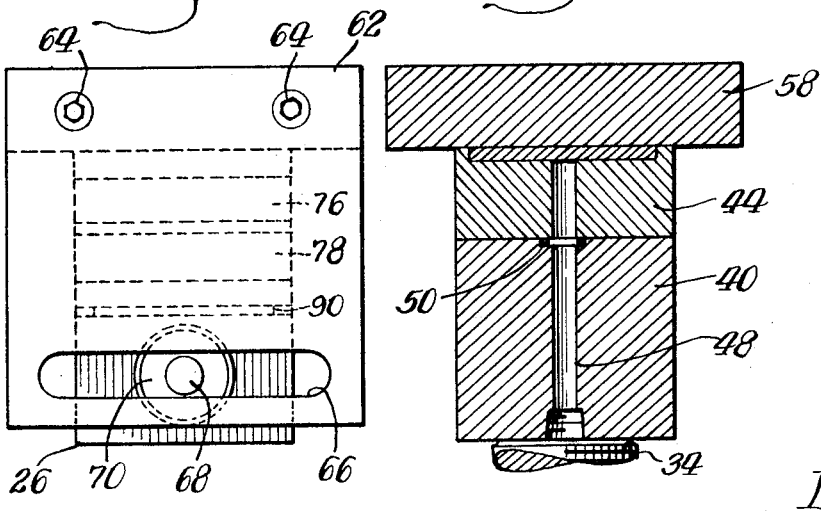
FIG. 5 is an end view of the balancing head shown in FIG. 2.
FIG. 6 is a cross sectional view taken along the line 6—6 of FIG. 2.

The bottom head unit 26 is constructed on an elongated block 40 having a raised top center portion 42. A pair of hydrostatic bearings 44 are secured at the opposite ends of the top center portion 42 by two bolts 46. Two passageways 48 (FIG. 6) are drilled, tapped and piped to carry oil from a hydraulic oil supply system (not shown) through block 40 to the pair of hydrostatic bearings 44. Oil seals 50 are provided in annular recesses formed about the upper end of passageways 48 to prevent leakage between the bearings 44 and bottom support block 40.

The use of the pair of hydrostatic bearings 44 provides a friction free cushion of hydraulic oil between the top head unit 24 and the bottom head unit 26. Hydraulic oil is forced between the bottom flat surface of the top head unit 24 and the two hydrostatic bearings 44 and creates a lifting force of sufficient magnitude to raise the top head unit 24, rotor receptacle unit 60 and rotor enough to permit the oil to flow over the entire surface with a resulting oil cushion.

To absorb end thrust and rotatably guide top head unit 24, a pivot device 52 is provided comprising a guide block 54 mounted at the center of the top center portion 42 of bottom head unit 26 and a thrust bearing 12 which extends downwardly from the bottom of the support block 58 for top head unit 24. Guide block, which is secured in place by a pair of bolts 60, has a pair of parallel upstanding walls 62 for slidably receiving thrust bearing 56 to permit the top head unit 24 to reciprocate. Thus pivot device 52 allows the top head unit 24 to move in a rotatable, reciprocable motion relative to the fixed bottom head unit 26.

The top head unit 24 is constructed on elongated top block 58, whose ends extend beyond the ends of bottom block 40. Top block 58 serves as the base for rotor receptacle unit 60 (FIG. 1) which could be any of the known units used with balancing machines.

End plates 62 (FIGS. 2 and 5) are secured to the opposite ends of top block 58 by bolts 64 and extend downwardly. A horizontal slot 66 is provided in each end plate 62 near its lower edge and a pair of horizontal rods 68 extend therethrough to limit the pivotal movement of top head unit 24 in either direction. Each rod 68 is threaded into a threaded bore formed in the ends of bottom block 40 and carry a resilient bumper 70 which serves as a stop for the sliding movement of top head unit 24 relative to the bottom head unit 26.

One of the important features of this invention is the magnetic centering device 74 for the balancing heads 14 which retains the heads in their proper centered position without the usual metal-to-metal contact. Centering device 74 comprises a pair of upper magnets 76 disposed in close proximity to a pair of lower magnets 78. The upper and lower magnets 76 and 78, respectively, consist of two flat, high power, magnetic blanks 80 and 82 with attracting poles in face-to-face relation fastened, respectively, to upper and lower blocks 58 and 40 by a set of screws 84 and 86. The retaining force between the opposing pair of magnets 76 and 78 is adjustable by placing spacers 90 of various thicknesses between magnetic blanks 82 and bottom block 40.

From the foregoing description, it will be appreciated that the use of hydrostatic bearings 44 allows for frictionless horizontal movement of top head unit 24. The oil film provided between bearings 44 and top block 58 lift and support top head unit 24 and the associated rotor receptacle unit 60.

Furthermore, the use of the magnetic centering device 74 retains the heads 14 in a centered relation without any metal-to-metal contact and restrains the override horizontal movement of the top head unit 24.

I claim:

1. A balancing head for use on a dynamic balancing machine comprising: a bottom head unit having a bottom block member adaptable to be mounted on the base of the balancing machine and a top head unit having a top block member, means for coupling said top block member at its center to said bottom block member to guide said top block member in a rotatable reciprocable motion relative to said bottom block member, bearing means between said top and bottom block to support said top unit, and further comprising means for providing a magnetic attraction between said top and bottom blocks to center said top head unit relative to said bottom head unit.

2. A balancing head as defined in claim 1, further comprising means for limiting the horizontal movement of said top head unit.

3. A balancing head as defined in claim 1, wherein said means for providing a magnetic attraction comprises a first magnet supported from the bottom surface of said top block member and a second magnet mounted on the top surface of said bottom block member, where said first and second magnets are disposed in vertical alignment in close proximity with their poles arranged in opposite and attracting relation whenever said top head unit is moved to a centered position relative to said bottom head unit.

4. A balancing head as defined in claim 3, wherein said means for providing a magnetic attraction further comprises means for varying the spacing between said first and second magnets.

5. A balancing head as defined in claim 1, wherein said top block member has a raised center portion and said coupling means is disposed at the center of said center portion and wherein said hydrostatic bearing means comprises a pair of hydrostatic bearings mounted on the top surface of said raised center portion and disposed on opposite sides of said coupling means and means for carrying oil to said bearings.

6. A balancing head as defined in claim 5, wherein said means for providing a magnetic attraction comprises a first pair of magnetic blanks mounted to the top surface of said bottom block member on opposite sides of said raised center portion and a second pair of magnetic blanks supported from the bottom surface of said top block member, where said second pair of magnetic blanks are brought into vertical alignment with and separated a slight distance from said first pair of magnetic blanks with their poles arranged in opposite and attracting relation whenever said top head unit is moved to a centered position relative to said bottom head unit.

7. A balancing head for use on a dynamic balancing machine comprising a bottom head unit including a bottom block member adaptable to be mounted on the base of the balancing machine and a top head unit including a top block member, said bottom block member having a rectangular cross section and an upper raised center portion, said top block member having a rectangular cross sectional and having a longitudinal dimension greater than the longitudinal dimension of said bottom block member, means for coupling said top block member at its center to the center of said upper raised center portion of said bottom block member to guide said top block member in a rotatable reciprocable motion relative to said bottom block, a pair of hydrostatic bearings mounted on the top surface of said raised center portion and disposed on opposite sides of said coupling means, means for carrying oil to said bearings, a first pair of magnetic blanks mounted to the top surface of said bottom block member on opposite sides of said raised center portion and a second pair of magnetic blanks supported from the bottom surface of said top block member, where said second pair of magnetic blanks are brought into vertical alignment with and separated a slight distance from said first pair of magnetic blanks with their poles arranged in opposite and attracting relation whenever said top head unit is moved to a centered position relative to said bottom head unit.

8. A balancing head as defined in claim 7 further comprising a pair of end plates extending downwardly from the opposite ends along the longitudinal dimension of said top block member and having a cross slot, and a pair of rods projecting from the opposite ends of said bottom block in direct alignment with said cross and of sufficient length to ride in said cross slots, where the length of said cross slot is selected to limit the horizontal swing of said top head unit.

* * * * *